US012675843B2

(12) United States Patent
Kwon et al.

(10) Patent No.: US 12,675,843 B2
(45) Date of Patent: Jul. 7, 2026

(54) METHOD AND APPARATUS FOR PROCESSING IMAGE BASED ON NEURAL NETWORK

(71) Applicants:SAMSUNG ELECTRONICS CO., LTD., Suwon-si (KR); Seoul National University R&DB Foundation, Seoul (KR)

(72) Inventors: Kinam Kwon, Suwon-si (KR); Heewon Kim, Seoul (KR); Kyoung Mu Lee, Seoul (KR); Hyong Euk Lee, Suwon-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 279 days.

(21) Appl. No.: 18/495,377

(22) Filed: Oct. 26, 2023

(65) Prior Publication Data

US 2024/0161230 A1 May 16, 2024

(30) Foreign Application Priority Data

Nov. 11, 2022    (KR) ........................ 10-2022-0150196

(51) Int. Cl.
| | |
|---|---|
| *G06T 3/4046* | (2024.01) |
| *G06T 5/60* | (2024.01) |
| *G06T 5/70* | (2024.01) |

(52) U.S. Cl.
CPC .............. *G06T 3/4046* (2013.01); *G06T 5/60* (2024.01); *G06T 5/70* (2024.01)

(58) Field of Classification Search
CPC .... G06T 5/00; G06T 5/60; G06T 5/70; G06T 3/4046
See application file for complete search history.

(56) References Cited

U.S. PATENT DOCUMENTS

| | | |
|---|---|---|
| 10,798,387 B2 | 10/2020 | Li et al. |
| 2009/0232409 A1 | 9/2009 | Marchesotti |
| 2010/0119163 A1* | 5/2010 | Inoue ........................ G06T 5/70 |
| | | 382/224 |
| 2020/0402205 A1* | 12/2020 | Su ............................ G06T 5/20 |

(Continued)

FOREIGN PATENT DOCUMENTS

| | | |
|---|---|---|
| KR | 10-1719702 | 3/2017 |
| KR | 10-2053242 | 12/2019 |

(Continued)

OTHER PUBLICATIONS

Khashabi et al, "Joint Demosaicing and Denoising via Learned Non-parametric Random Fields" (published in IEEE Transactions on Image Processing, vol. 23, No. 12, pp. 4968-4981, Dec. 2014).*

(Continued)

*Primary Examiner* — Casey L Kretzer
(74) *Attorney, Agent, or Firm* — F. CHAU & ASSOCIATES, LLC

(57) ABSTRACT

A neural network-based image processing method and apparatus are provided. The method includes receiving an input image having a first resolution, and estimating a preview image of the input image having a second resolution that is lower than the first resolution by using a neural network model.

19 Claims, 16 Drawing Sheets

(56) References Cited

U.S. PATENT DOCUMENTS

| 2022/0122305 A1 | 4/2022 | Smith et al. | |
| 2022/0148130 A1* | 5/2022 | Tang ........................ | G06N 3/09 |

FOREIGN PATENT DOCUMENTS

| KR | 10-2022-0027436 | 3/2022 |
| KR | 10-2424538 | 7/2022 |

OTHER PUBLICATIONS

Samadani, et al., "Image Thumbnails That Represent Blur and Noise", in IEEE Transactions on Image Processing, vol. 19, No. 2, Feb. 2, 2010, pp. 363-373.

Esmaeili, et al., "Fast-AT: Fast Automatic Thumbnail Generation using Deep Neural Networks", arXiv preprint arXiv:1612.04811v2 [cs.CV] Apr. 10, 2017, pp. 1-9.

European Search Report issued by the European Patent Office on Apr. 23, 2024 in corresponding European Patent Application No. 23209198.3, 9 pages.

* cited by examiner

Input image
501

Low-resolution
restored image
511

Characteristic
vector
602

Low-resolution
restored image
601

Preview image
611

METHOD AND APPARATUS FOR PROCESSING IMAGE BASED ON NEURAL NETWORK

CROSS-REFERENCE TO RELATED APPLICATION

This application claims the benefit of Korean Patent Application No. 10-2022-0150196 filed on Nov. 11, 2022, in the Korean Intellectual Property Office, the entire disclosure of which is incorporated herein by reference for all purposes.

BACKGROUND

1. Field of the Invention

One or more embodiments relate to a method and apparatus for processing an image based on a neural network.

2. Description of the Related Art

A deep learning-based neural network may be used for image processing. The neural network may be trained based on deep learning and may perform inference for a desired purpose by mapping input data and output data that are in a nonlinear relationship to each other. Such a trained capability of generating the mapping may be referred to as a learning ability of the neural network. The neural network trained for a special purpose, such as image restoration, may have a generalization ability to generate a relatively accurate output in response to an input pattern that is not yet trained.

SUMMARY

According to an aspect, there is provided an image processing method including receiving an input image having a first resolution, and estimating a preview image of the input image having a second resolution that is lower than the first resolution by using a neural network model. The neural network model may apply an image characteristic of the input image having the first resolution to the preview image having the second resolution, and the image characteristic observed from the input image having the first resolution may be observed from the preview image having the second resolution.

According to another aspect, there is provided an image processing apparatus including a processor, and a memory configured to store instructions executable by the processor. In response to the instructions being executed by the processor, the processor may receive an input image having a first resolution, estimate a preview image of the input image having a second resolution that is lower than the first resolution by using a neural network model, the neural network model may apply an image characteristic of the input image having the first resolution to the preview image having the second resolution, and the image characteristic observed from the input image having the first resolution may be observed from the preview image having the second resolution.

According to still another aspect, there is provided an electronic apparatus including a camera configured to generate an input image, and a processor configured to receive an input image having a first resolution, and estimate a preview image of the input image having a second resolution that is lower than the first resolution by using a neural network model. The neural network model may apply an image characteristic of the input image having the first resolution to the preview image having the second resolution, and the image characteristic observed from the input image having the first resolution may be observed from the preview image having the second resolution.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 9 and 10 are diagrams illustrating examples of results of various image processing.

DETAILED DESCRIPTION

Figure 1:
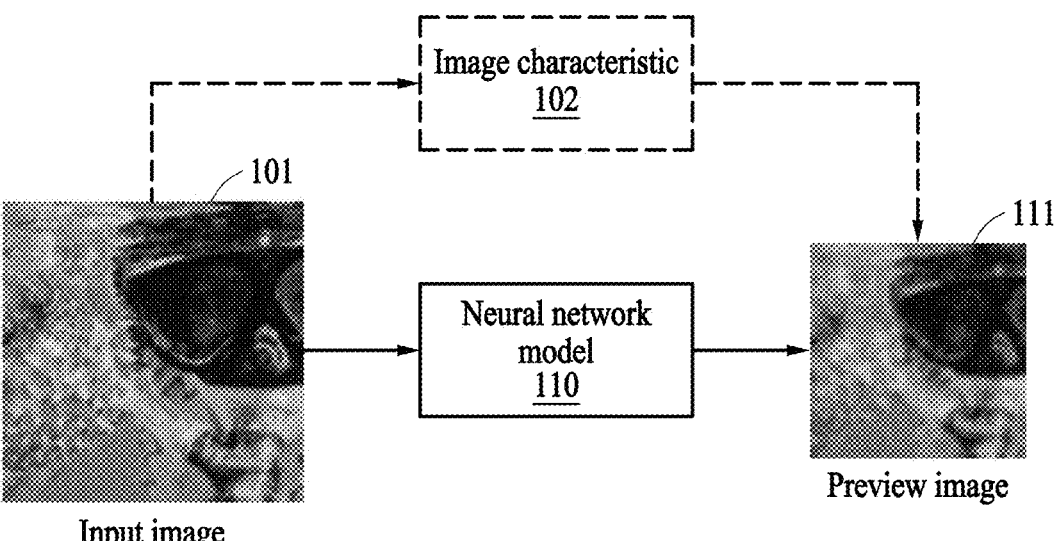
FIG. 1 is a diagram illustrating an example of an image processing process using a neural network model.

The following detailed structural or functional description is provided as an example only and various alterations and modifications may be made to the examples. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "at least one of A and B", "at least one of A, B, or C," and the like, each of which may include any one of the items listed together in the corresponding one of the phrases, or all possible combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the examples will be described in detail with reference to the accompanying drawings. When describing the embodiments with reference to the accompanying drawings, like reference numerals refer to like elements and a repeated description related thereto will be omitted.

FIG. 1 is a diagram illustrating an example of an image processing process using a neural network model. Referring to FIG. 1, an image processing apparatus may generate a preview image 111 of an input image 101 by using a neural network model 110. The neural network model 110 may include a deep neural network (DNN) including a plurality of layers. The plurality of layers may include an input layer, at least one hidden layer, and an output layer.

The DNN may include at least one of a fully connected network (FCN), a convolutional neural network (CNN), or a recurrent neural network (RNN). For example, at least a portion of the layers included in the neural network may correspond to a CNN, and another portion of the layers may correspond to an FCN. The CNN may be referred to as convolutional layers, and the FCN may be referred to as fully connected layers.

In the case of the CNN, data input to each layer may be referred to as an input feature map, and data output from each layer may be referred to as an output feature map. The input feature map and the output feature map may also be referred to as activation data. When a convolutional layer corresponds to an input layer, the input feature map of the input layer may be an image.

After trained based on deep learning, the neural network may perform an inference that is suitable for a purpose for the training by mapping input data and output data that are in a nonlinear relationship to each other. The deep learning may be a machine learning scheme for solving an issue such as image or voice recognition from a big data set. The deep learning may be understood as a process of solving an optimization issue to find a point at which energy is minimized while training a neural network based on prepared training data.

Through supervised or unsupervised learning of deep learning, a weight corresponding to an architecture or model of the neural network may be obtained. Through such a weight, the input data and the output data may be mapped. For example, when a width and a depth of the neural network are sufficiently large, the neural network may have a capacity large enough to implement an arbitrary function. When the neural network is trained based on a sufficiently large quantity of training data through an appropriate training process, an optimal performance may be achieved.

The neural network may be expressed as being trained in advance, in which "in advance" means "before" the neural network is started. The "started" neural network may indicate that the neural network may be ready for inference. For example, "start" of the neural network may include loading of the neural network in a memory, or an input of input data for inference to the neural network after the neural network is loaded in a memory.

The neural network model 110 may apply an image characteristic 102 of the input image 101 to the preview image 111. The image characteristic 102 may include a degradation characteristic such as noise or blur. The preview image 111 may have a resolution lower than that of the input image 101. The input image 101 may have a first resolution or high resolution and the preview image 111 may have a second resolution or low resolution. When the high-resolution input image 101 is simply downscaled to a low-resolution image, the image characteristic 102 of the input image 101 may not be shown in the low-resolution image. For example, noise observed in the high-resolution input image 101 may not be observed in the low-resolution image. This is because the image characteristic 102 is also deteriorated due to the reduction of an image size. In this case, it may be difficult to identify the image characteristic 102 of the input image 101 through the low-resolution image.

More specifically, the image characteristic 102 that is observed in a high-resolution state but not well observed in a low-resolution state may be referred to as a pixel level characteristic. The pixel level characteristic may refer to the image characteristic 102 that is observed in a state in which an image is upscaled to a high resolution to the extent that each pixel is visible. As the image characteristic 102 of the input image 101 is applied to the preview image 111, the pixel level characteristic of the input image 101 may be observed from the preview image 111. The image characteristic 102 (e.g., a noise level) according to the resolution of the input image 101 may be converted to match the resolution of the preview image 111 and applied to the preview image 111. Accordingly, the image characteristic 102 (e.g., the noise level) of the input image 101 may be easily identified through the preview image 111.

According to an embodiment, the image processing apparatus may estimate the image characteristic 102 of the input image 101 based on the input image 101, estimate a low-resolution temporarily restored image by performing the image downscaling and image restoration based on the input image 101, and estimate the preview image 111 by applying the image characteristic 102 to the temporarily restored image. According to an embodiment, the neural network model 110 may include a first model configured to estimate the image characteristic 102 of the input image 101, a second model configured to estimate the temporarily restored image, and a third model configured to apply the image characteristic 102 to the temporarily restored image. For example, the first model may correspond to a characteristic estimation model 210 of FIG. 2 and a characteristic estimation model 300 of FIG. 3. For example, the second model may correspond to an image restoration model 220 of FIG. 2, an image restoration model 400 of FIG. 4, and an image restoration model 500 of FIG. 5. For example, the third model may correspond to a characteristic application model 230 of FIG. 2 and a characteristic application model 610 of FIG. 6. According to an embodiment, the neural network model 110 may include a fourth model configured to estimate the image characteristic 102 of the input image 101, estimate the temporarily restored image, and apply the image characteristic 102 to the temporarily restored image. For example, the fourth model may correspond to an image restoration model 1510 of FIG. 16.

According to another embodiment, the image processing apparatus may estimate the image characteristic 102 of the input image 101 based on the input image 101, estimate a low-resolution temporary image by performing the image downscaling based on the input image 101, and estimate the preview image 111 by applying the image characteristic 102 to the temporary image. According to an embodiment, the neural network model 110 may include a first model configured to estimate the image characteristic 102 of the input image 101, a fifth model configured to estimate the temporary image, and a third model configured to apply the image characteristic to the temporary image. For example, the first model may correspond to the characteristic estimation model 210 of FIG. 2, the characteristic estimation model 300 of FIG. 3, and a characteristic estimation model 1710 of FIG. 17. For example, the fifth model may correspond to an image restoration model 1720 of FIG. 17, the characteristic application model 230 of FIG. 2, the characteristic application model 610 of FIG. 6, and a characteristic application model 1730 of FIG. 17.

The preview image 111 may be utilized in various ways. For example, when the input image 101 is edited in an image editing tool while the input image 101 is downscaled, the preview image 111 expressing the pixel level characteristic may be displayed in the image editing tool. In this case, a user may edit the input image 101 while checking the pixel level characteristic in a low-resolution state. In another example, the preview image 111 may be provided as a live view provided in a case of capturing an image. In this case, a sense of difference between the live view and the captured result may be reduced. In still another example, the preview image 111 may be used as a thumbnail of an application such as an album. In this case, the user can check the pixel level characteristic of each image through each thumbnail in the low-resolution state, and may perform image sharing or image deletion.

According to an embodiment, the preview image 111 may be used in an image restoration procedure. Various restoration characteristics may be considered when restoring an image. For example, the restoration characteristics may include at least some of denoising and deblurring. The image processing apparatus may generate candidate restored images having a low resolution by performing a restoration task according to a plurality of restoration characteristics on the preview image 111, and may generate a restored image having a high resolution by performing a restoration task on the input image 101 according to a candidate restoration characteristic selected from the plurality of candidate restoration characteristics. Each candidate restored image may show a pixel level characteristic of the input image 101. Accordingly, the user may confirm a restoration effect of each candidate restoration characteristic through the candidate restored images. The restoration task on a high-resolution image may require a larger amount of computation than the restoration task on a low-resolution image.

Although the plurality of candidate restoration characteristics are considered in the image restoration procedure using the preview image 111, the restoration task on the high-resolution image may be performed only once. Therefore, the amount of computation may be reduced.

Figure 2:
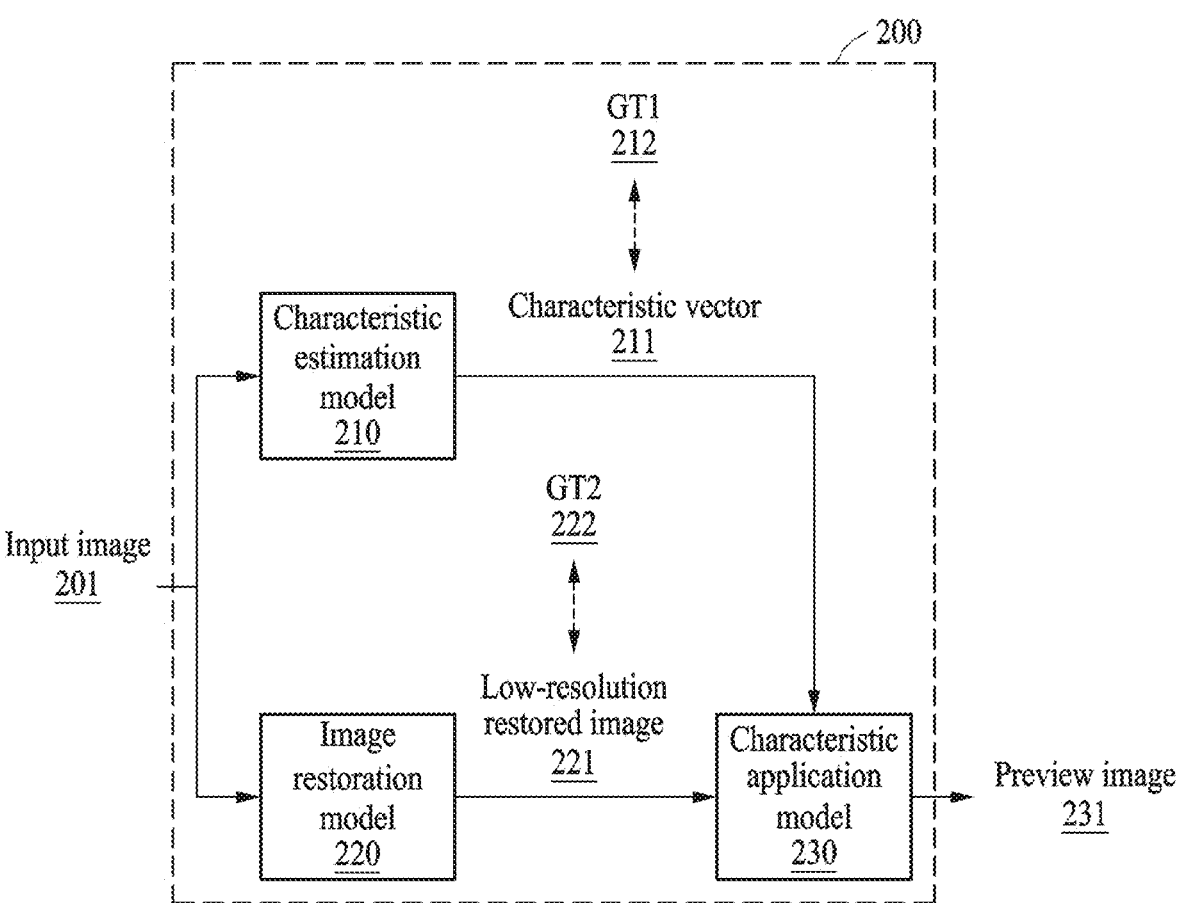
FIG. 2 is a diagram illustrating an example of a structure of a neural network.

FIG. 2 is a diagram illustrating an example of a structure of a neural network. Referring to FIG. 2, a neural network model 200 may include a characteristic estimation model 210, an image restoration model 220, and a characteristic application model 230. The characteristic estimation model 210 may estimate a characteristic vector 211 representing an image characteristic of the input image 201 by estimating the characteristic of the input image 201. According to an embodiment, each of vector values of the characteristic vector 211 may indicate a level of an individual image characteristic of the input image 201. For example, the characteristic vector 211 may include at least one of a first vector value indicating a noise level, a second vector value indicating a blur level, or a third vector value indicating a compression quality factor. The characteristic estimation model 210 may be trained through GT1 212 corresponding to ground truth (GT) for the characteristic vector 211. The image restoration model 220 may estimate a low-resolution restored image 221 from the input image 201. The image restoration model 220 may perform image downscaling and image restoration. The image restoration model 220 may be trained through GT2 222 corresponding to GT for the low-resolution restored image 221. The characteristic application model 230 may generate a preview image 231 by applying the characteristic vector 211 to the low-resolution restored image 221.

Figure 3:
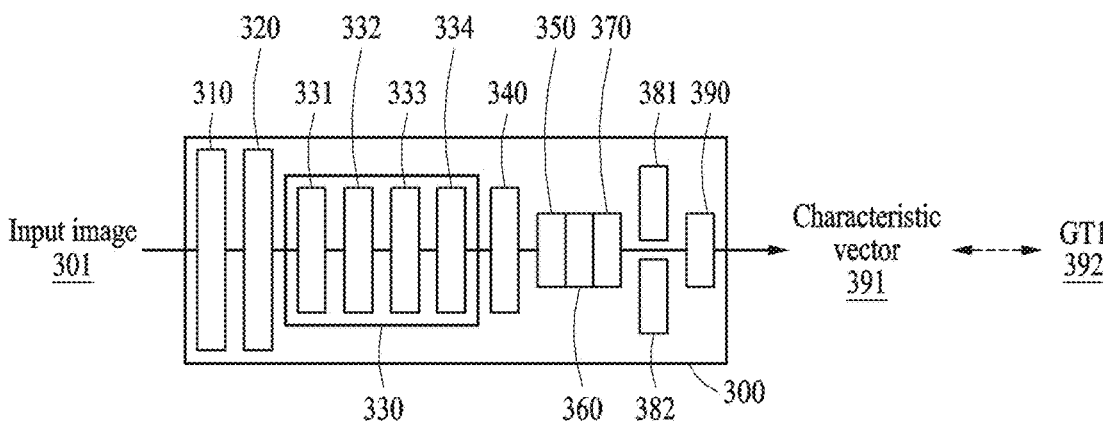
FIG. 3 is a diagram illustrating an example of a structure of a characteristic estimation model.

FIG. 3 is a diagram illustrating an example of a structure of a characteristic estimation model. Referring to FIG. 3, a characteristic estimation model 300 may include a convolutional layer 310, residual blocks 320, 340, and 360, reduction blocks 330, 350, and 370, pooling layers 381 and 382, and a fully connected layer 390. The reduction block 330 may include convolutional layers 331 and 333 and nonlinear function layers 332 and 334. For example, the nonlinear function may be a ReLU function. The residual blocks 320, 340, and 360 may have the same structure as a residual block 430 of FIG. 4. The reduction blocks 350 and 370 may have the same structure as the reduction block 330. The characteristic estimation model 300 may output a characteristic vector 391 according to an input of an input image 301. The characteristic estimation model 300 may be trained according to a loss between the characteristic vector 391 and GT1 392.

Figure 4:
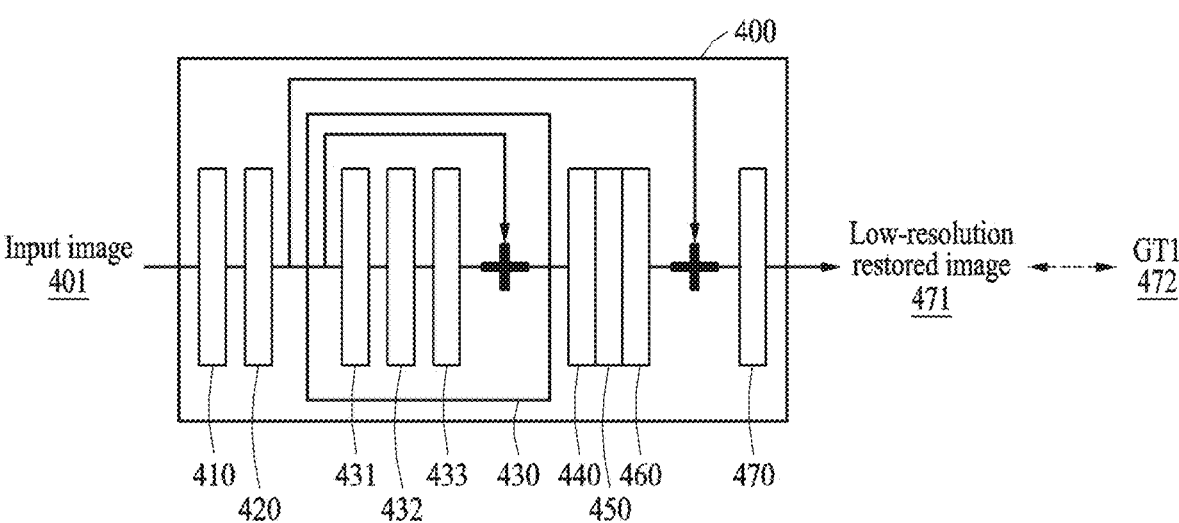
FIG. 4 is a diagram illustrating an example of a structure of an image restoration model.

FIG. 4 is a diagram illustrating an example of a structure of an image restoration model. Referring to FIG. 4, the image restoration model 400 may include a downscaling block 410, convolutional layers 420, 460, and 470, and residual blocks 430, 440, and 450. For example, the downscaling block 410 may perform bicubic downscaling. The residual block 430 may include convolutional layers 431 and 433 and a reduction block 432. The reduction block 432 may have the same structure as the reduction block 330 of FIG. 3. The residual blocks 440 and 450 may have the same structure as the residual block 430. The image restoration model 400 may output a low-resolution restored image 471 according to an input of an input image 401. The image restoration model 400 may be trained according to a loss between the low-resolution restored image 471 and GT2 472.

Figure 5:
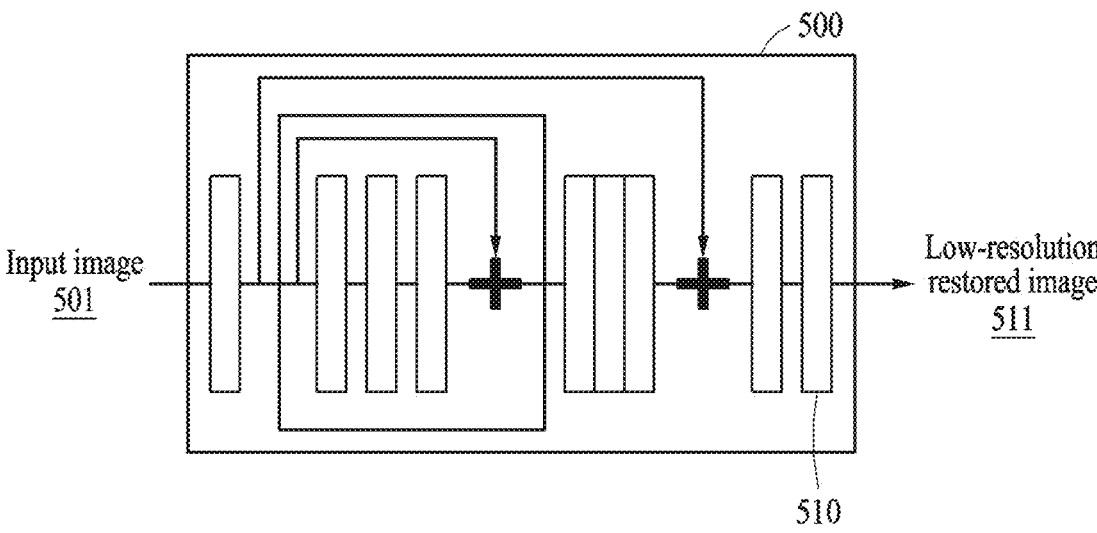
FIG. 5 is a diagram illustrating another example of a structure of an image restoration model.

FIG. 5 is a diagram illustrating another example of a structure of an image restoration model. Referring to FIG. 5, an image restoration model 500 of FIG. 5 may include a downscaling block 510 at the end, unlike the image restoration model 400 of FIG. 4. The image restoration model 400 of FIG. 4 may perform the image restoration after the image downscaling, and the image restoration model 500 of FIG. 5 may perform the image downscaling after the image restoration. The image restoration model 500 may output a low-resolution restored image 511 according to an input of an input image 501.

Figure 6:
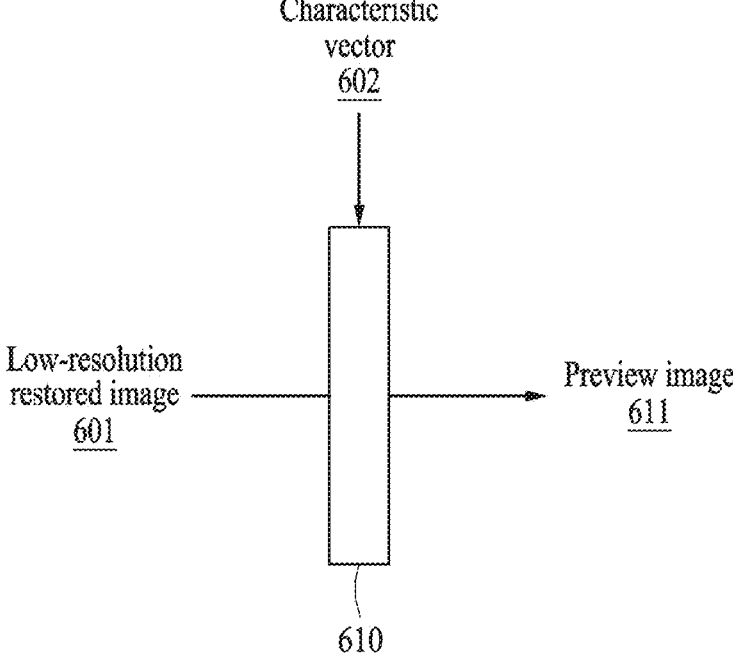
FIG. 6 is a diagram illustrating an example of a structure of a characteristic application model.

FIG. 6 is a diagram illustrating an example of a structure of a characteristic application model. Referring to FIG. 6, the characteristic application model 610 may output a preview image 611 according to an input of a low-resolution restored image 601 and a characteristic vector 602. The characteristic application model 610 may apply the characteristic vector 602 to the low-resolution restored image 601. The characteristic vector 602 may include a degradation characteristic, and the characteristic application model 610 may correspond to a degradation model.

According to an embodiment, each of vector values of the characteristic vector 602 may indicate a level of an individual image characteristic of the input image. For example, the characteristic vector 602 may include at least one of a first vector value indicating a noise level, a second vector value indicating a blur level, or a third vector value indicating a compression quality factor. The image characteristic of the input image may be applied to the preview image 611 through the characteristic vector 602. The characteristic vector 602 may be expressed as (noise level, blur level, compression quality factor). For example, the characteristic vector 602 of the input image may be (3, 3, 3). As the characteristic vector of (3, 3, 3) is applied to the low-resolution restored image 601, the preview image 611 may show the image characteristic of (3, 3, 3). Accordingly, a pixel level characteristic of a high-resolution input image may be shown in the low-resolution preview image 611. The pixel level characteristic may refer to an image characteristic that is observed in a high-resolution state but not well observed in a low-resolution state.

Figure 7:
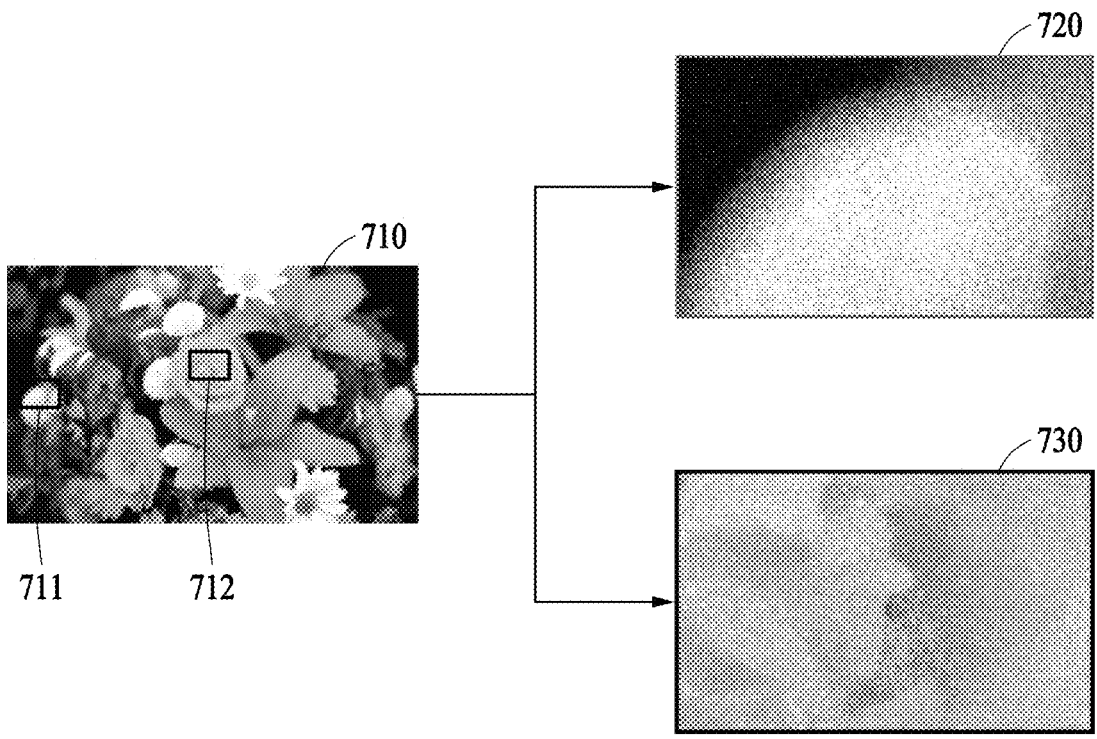
FIG. 7 is a diagram illustrating an example of an image characteristic of an input image shown through an upscaled image of a preview image.

FIG. 7 is a diagram illustrating an example of an image characteristic of an input image shown through an upscaled image of a preview image. Referring to FIG. 7, a low-resolution image 710 may correspond to a simply-downscaled version of an input image. The simply-downscaled version may be generated by simply lowering the resolution of the input image without using the image characteristic of the input image. It may be difficult to observe a pixel level characteristic of the input image through the low-resolution image 710. For example, according to the low-resolution image 710, a noise level of the low-resolution image 710 appears to be low. However, according to an upscaled image 720 of a first region 711 and an upscaled image 730 of a second region 712 of the low-resolution image 710, a significant noise level of the low-resolution image 710 may be observed.

Figure 8:
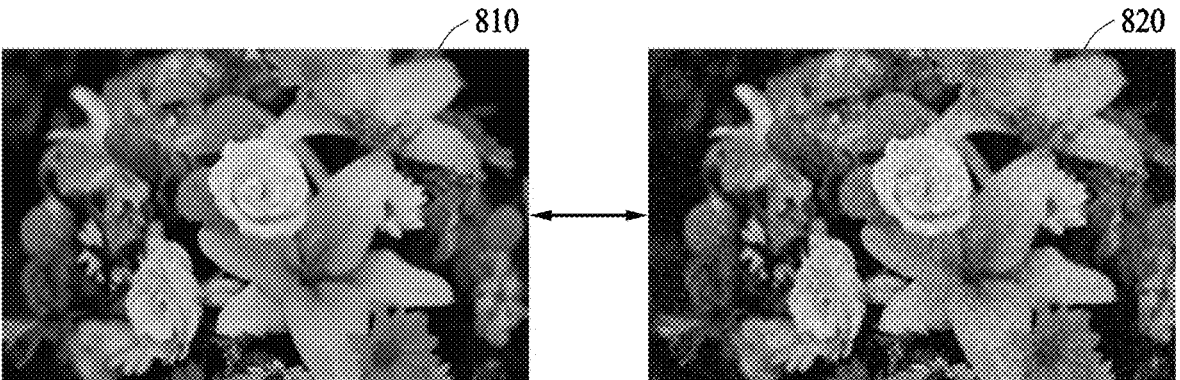
FIG. 8 is a diagram illustrating an example of a preview image to which an image characteristic of an input image is applied.

FIG. 8 is a diagram illustrating an example of a preview image to which an image characteristic of an input image is applied. Referring to FIG. 8, unlike a low-resolution image 810, a significant noise level may be observed through a preview image 820. The low-resolution image 810 may correspond to the low-resolution image 710 of FIG. 7. The image characteristic of the input image may be applied to the preview image 820. As a result, a pixel level characteristic of the input image may be shown in the preview image 820.

Figure 9:
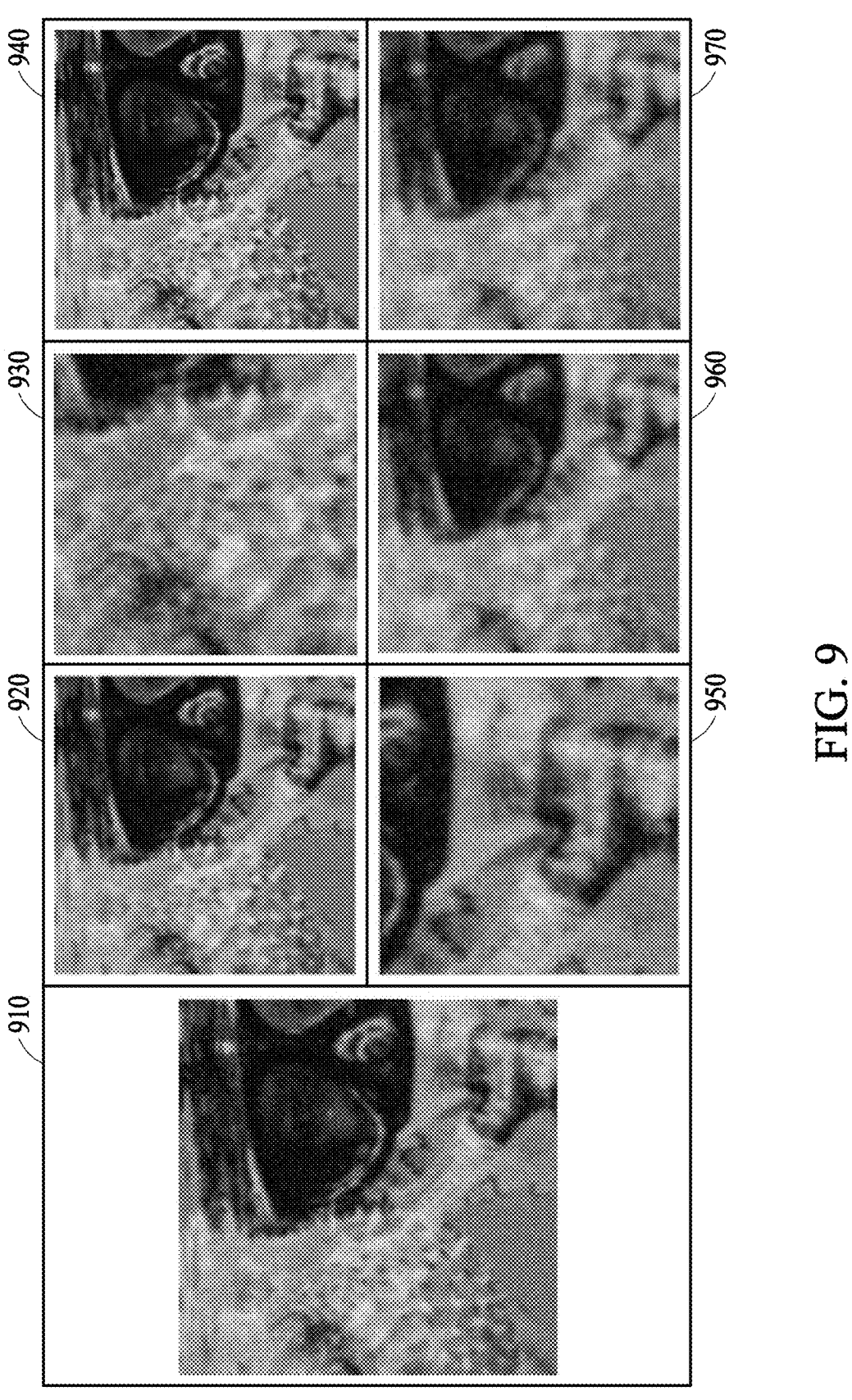
Figure 10:
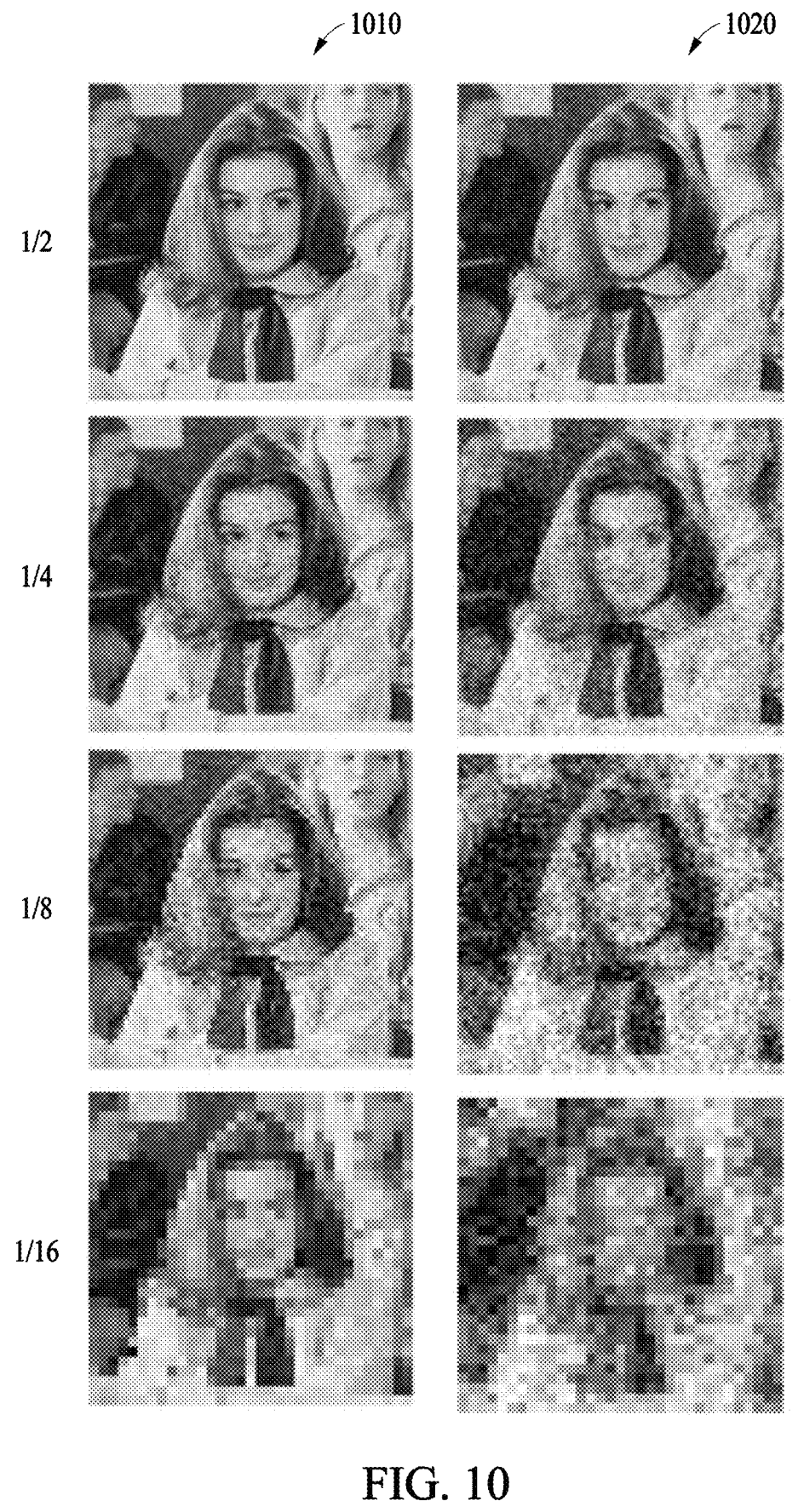

FIGS. 9 and 10 are diagrams illustrating examples of results of various image processing. FIG. 9 shows an input image 910, a low-resolution image 920, cropped images 930 and 950, a-low resolution restored image 940, a preview image 960, and a GT image 970. The input image 910 may correspond to a high-resolution image, and the remaining images 920 to 970 may correspond to low-resolution images. The low-resolution image 920 may be generated by simply downscaling the input image 910, and the random cropped images 930 and 960 may be generated by cropping random regions of the input image 910. A pixel level characteristic of the input image 910 is not observed in the low-resolution image 920, but the pixel level characteristic of the input image 910 may be observed in the preview image 960.

FIG. 10 shows low-resolution images 1010 generated through simple downscaling and preview images 1020 generated by applying a image characteristic of an input image. The low-resolution images 1010 and the preview images 1020 may have a resolution that is ½ of a resolution of the input image, a resolution that is ¼ thereof, a resolution that is ⅛ thereof, and a resolution that is 1/16 thereof, respectively. Although a pixel level characteristic of the input image is hardly observed from the low-resolution images 1010, the preview images 1020 may show the pixel level characteristic of the input image well despite the reduced resolution.

Figure 11:
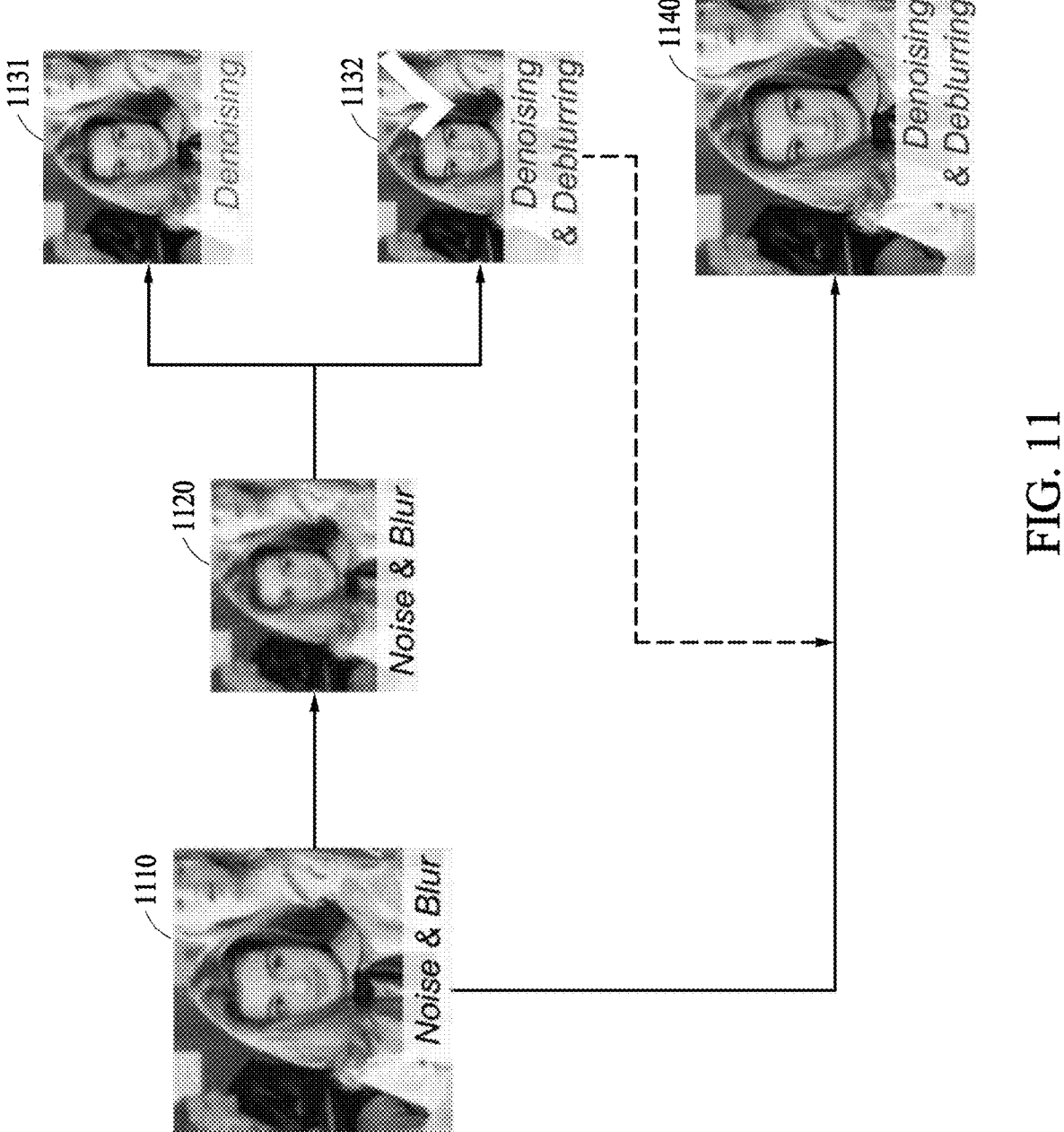
FIG. 11 is a diagram illustrating an example of an image restoration process.

FIG. 11 is a diagram illustrating an example of an image restoration process. Referring to FIG. 11, an input image 1110 may have a certain level of a noise characteristic and a certain level of a blur characteristic. A preview image 1120 may be generated according to the image characteristics of the input image 1110. The preview image 1120 may show a pixel level characteristic of the input image 1110 according to the noise characteristic and blur characteristic of the input image 1110. The input image 1110 may correspond to a high-resolution image, and the preview image 1120 may correspond to a low-resolution image.

Candidate restored images 1131 and 1132 may be generated by performing a restoration task according to the candidate restoration characteristics on the preview image 1120. The candidate restoration characteristics may include a denoising characteristic and a deblurring characteristic. The candidate restored images 1131 and 1132 may correspond to low-resolution images. Like the preview image 1120, the candidate restored images 1131 and 1132 may show the pixel level characteristic. The image characteristics according to the candidate restoration characteristics observed from the candidate restored images 1131 and 1132 having a high resolution when the candidate restored images 1131 and 1132 are upscaled to have the high resolution may be observed from the candidate restored images 1131 and 1132 having the low resolution.

The user may select one of the candidate restoration characteristics to be used for the image restoration from the candidate restoration characteristics with reference to the candidate restored images 1131 and 1132. The candidate restored images 1131 and 1132 may show the pixel level characteristic according to the candidate restoration characteristics and the user may relatively accurately predict a restoration result according to each candidate restoration characteristic. For example, the user may select the candidate restoration characteristics of the candidate restored image 1132. The image processing apparatus may generate a restored image 1140 by performing the restoration task on the input image 1110 according to the selected candidate restoration characteristics. The restored image 1140 may correspond to a high-resolution image.

Figure 12:
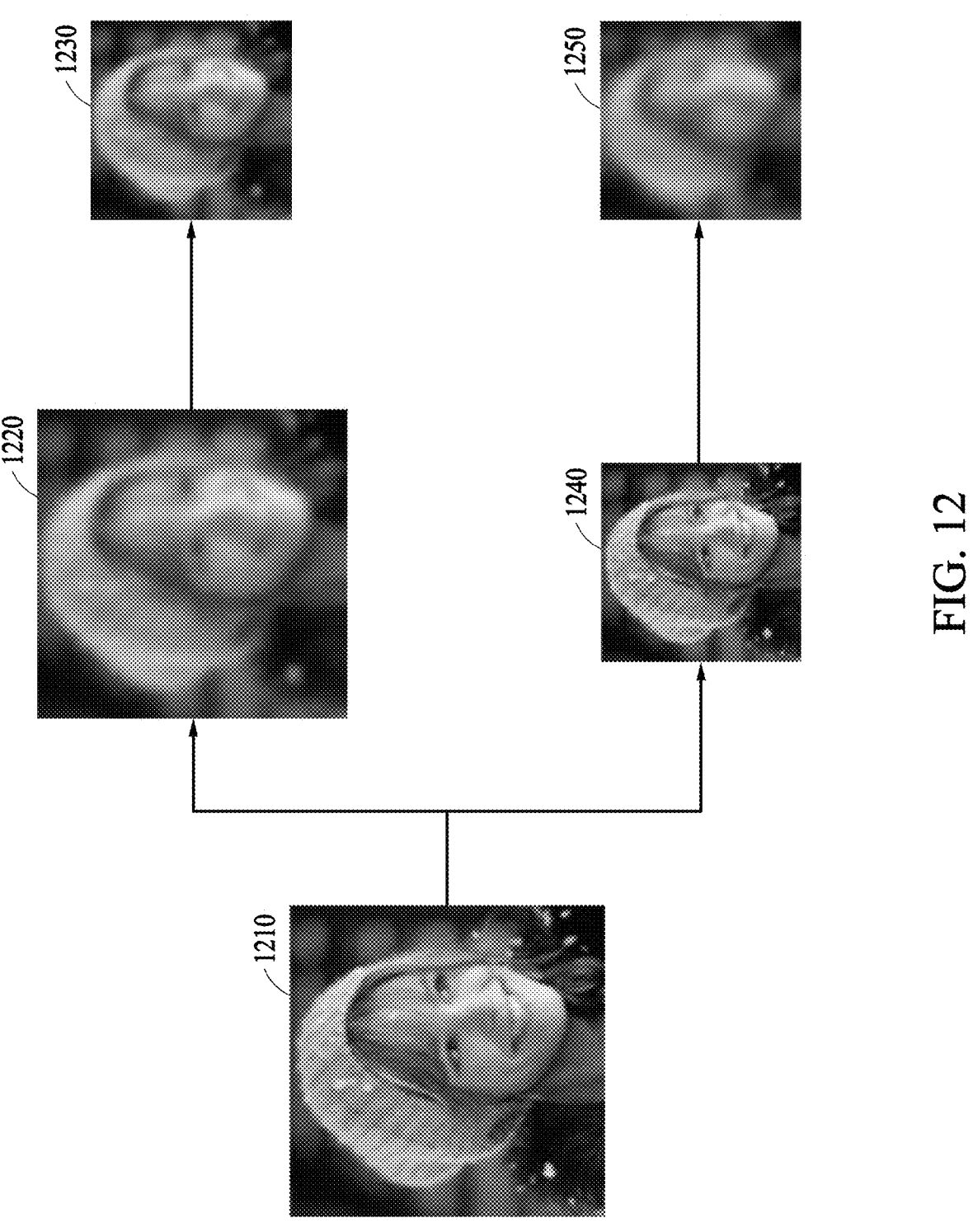
FIGS. 12, 13, and 14 are diagrams illustrating examples of a relationship between image downscaling and image characteristics.
Figure 13:
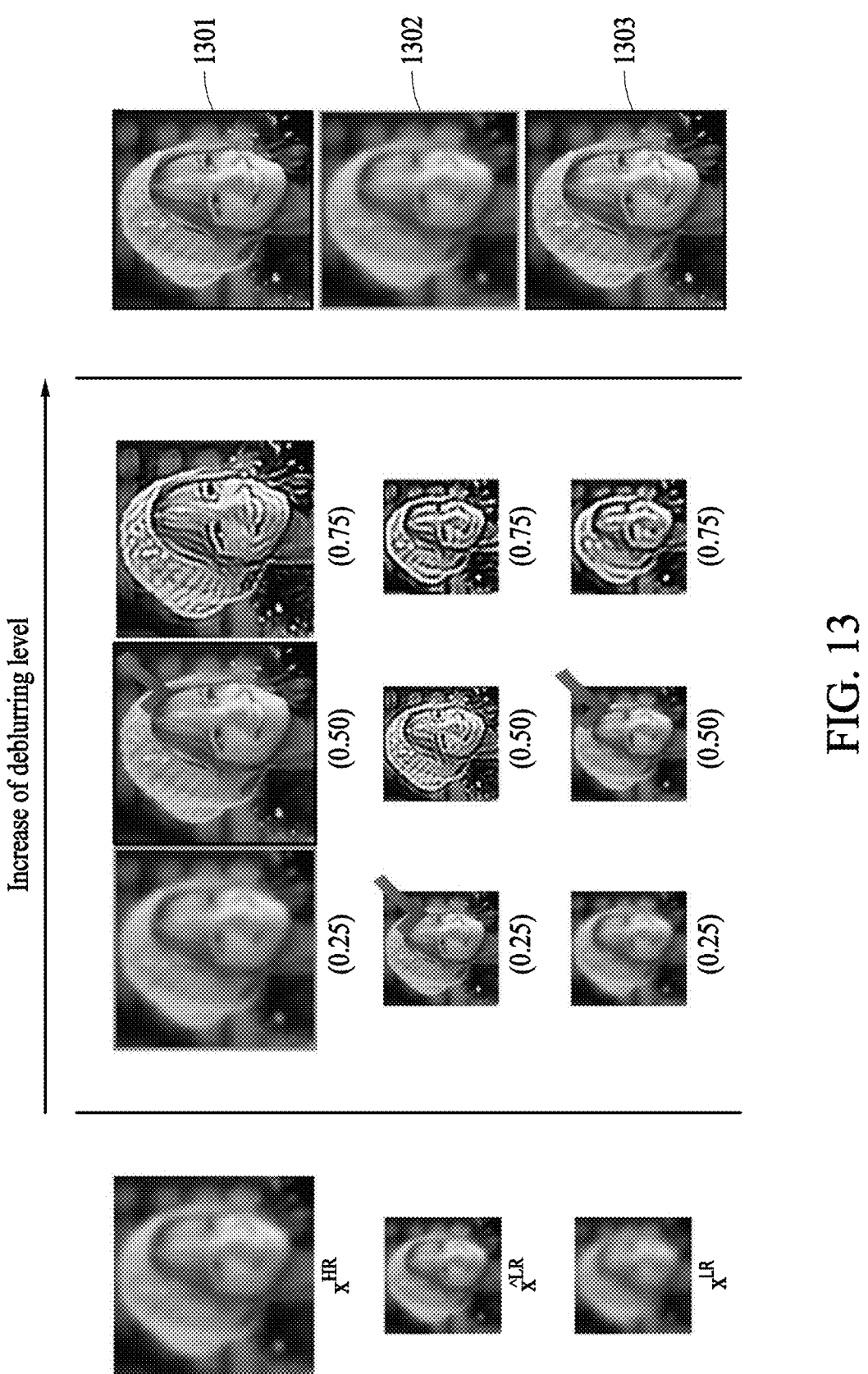
Figure 14:
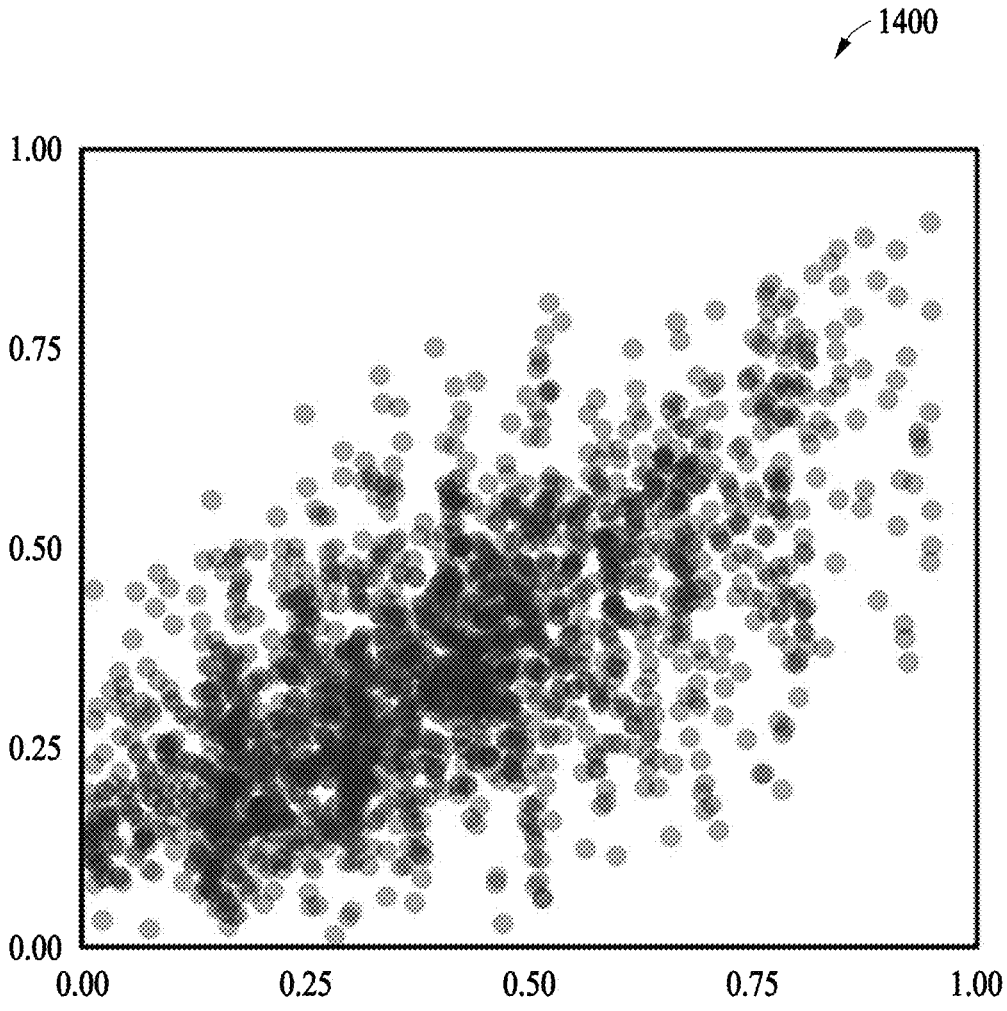

FIGS. 12, 13, and 14 are diagrams illustrating examples of a relationship between image downscaling and image characteristics. Referring to FIG. 12, a blur effect at a level of 0.5 may be applied to a first image 1210 to generate a second image 1220 and the second image 1220 may be downscaled to generate a third image 1230. The first image 1210 may be downscaled to generate a fourth image 1240, and the blur effect at the level of 0.5 may be applied to the fourth image 1240 to generate a fifth image 1250. The third image 1230 may have a blur at the level of 0.25 due to the image downscaling. The blur level of a final result may vary depending on the order of the image downscaling and blur effect application.

Referring to FIG. 13, a deblurring task based on a second image $x^{HR}$, a third image $\hat{x}^{LR}$, and a fifth image $x^{LR}$ may be performed. The second image $x^{HR}$, the third image $\hat{x}^{LR}$, and the fifth image $x^{LR}$ may correspond to the second image 1220, the third image 1230, and the fifth image 1250 of FIG. 12, respectively. If a deblurring level is determined according to the images $x^{HR}$, $x^{LR}$, and $\hat{x}^{LR}$, the deblurring level of 0.5 may be determined for the second image $x^{HR}$, the deblurring level of 0.25 may be determined for the third image $\hat{x}^{LR}$, and the deblurring level of 0.5 may be determined for the fifth image $x^{LR}$. In this case, the images $x^{HR}$ and $x^{LR}$ may be restored to have the blur level of 0 like high-resolution restored images 1301 and 1303, but the third image $\hat{x}^{LR}$ may be restored to have the blur level of 0.25 like a high-resolution restored image 1302.

A graph 1400 of FIG. 14 shows a mismatch between best restoration tasks due to inconsistency between degradation levels. It may be confirmed that, as the inconsistency between the degradation levels increases, the mismatch between restoration tasks also increases. Such a mismatch may occur when a pixel level characteristic of an original image is not observed through a low-resolution image. According to embodiments, such a mismatch may be reduced because the pixel level characteristic of the original image may be observed through the preview image.

Figure 15:
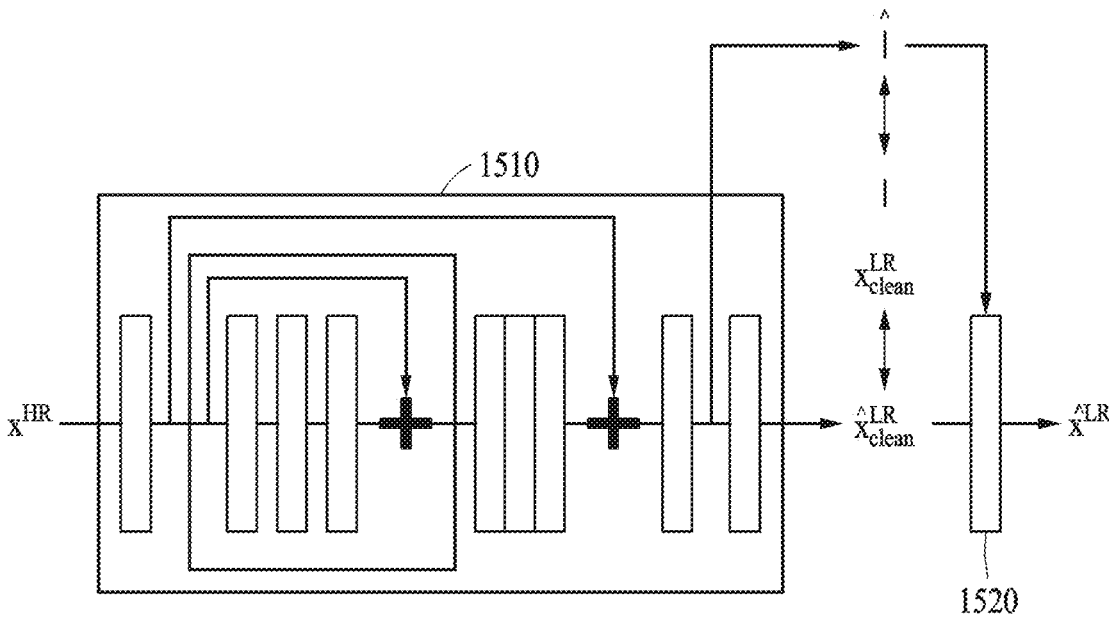
FIGS. 15, 16, and 17 are diagrams illustrating examples of various structures of a neural network model.
Figure 16:
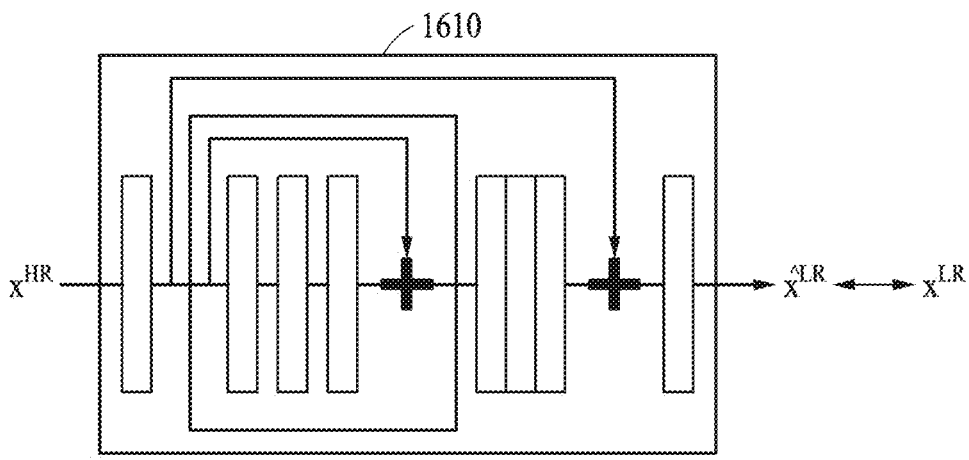
Figure 17:
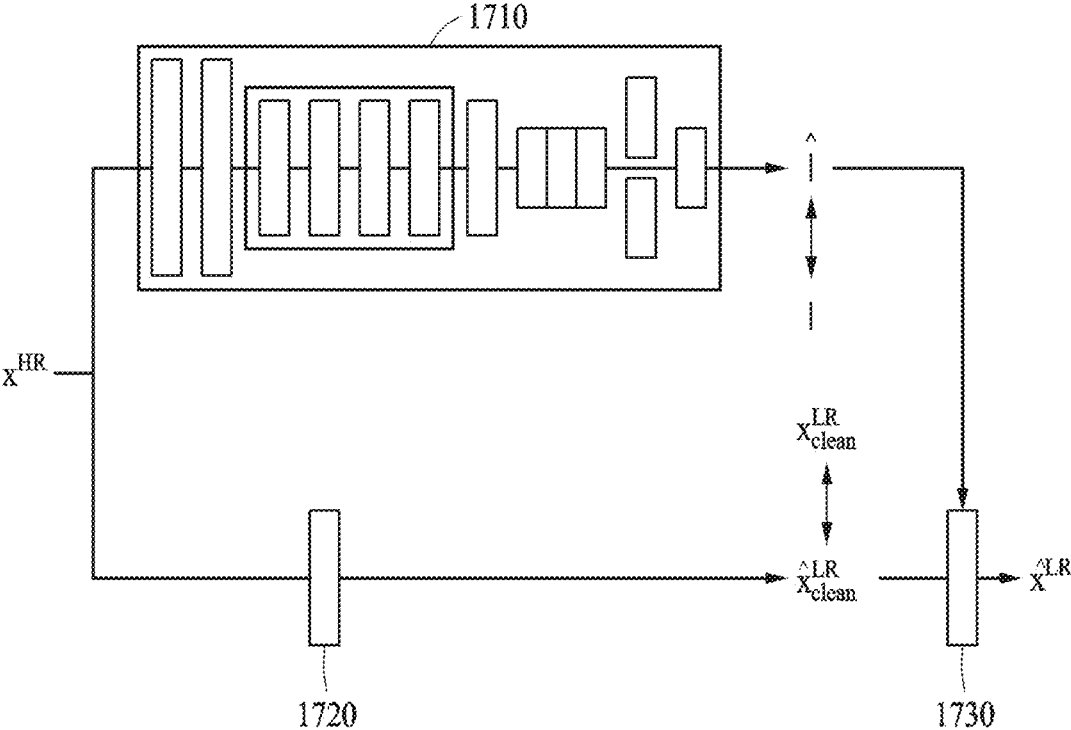

FIGS. 15, 16, and 17 are diagrams illustrating examples of various structures of a neural network model. The network structures of FIGS. 15 to 17 may correspond to modifications of the network structures of FIGS. 2 to 6. Referring to FIG. 15, an image restoration model 1510 may output a characteristic vector $\hat{l}$ and a low-resolution restored image $$\hat{x}^{LR}_{clean}$$

according to an input of an input image $x^{HR}$. The image restoration model 1510 may perform the image characteristic estimation, image downscaling, and image restoration. The image restoration model 1510 may be trained based on a loss between the characteristic vector $\hat{l}$ and GT l and a loss between the low-resolution restored image $$\hat{x}^{LR}_{clean}$$

and GT $$x^{LR}_{clean}.$$

A characteristic application model 1520 may generate a preview image $\hat{x}^{LR}$ by applying the characteristic vector $\hat{l}$ to the low-resolution restored image $$\hat{x}^{LR}_{clean}.$$

Referring to FIG. 16, an image restoration model 1610 may generate the preview image $\hat{x}^{LR}$ according to an input of the input image $x^{HR}$. The image restoration model 1610 may perform the image characteristic estimation, image downscaling, and image restoration. The image restoration may not be performed, if necessary. The image restoration model 1610 may be trained based on the loss between the preview image $\hat{x}^{LR}$ and GT $x^{LR}$.

Referring to FIG. 17, the characteristic estimation model 1710 may estimate the characteristic vector $\hat{l}$ according to an input of the input image $x^{HR}$. The characteristic estimation model 1710 may be trained based on the loss between characteristic vector $\hat{l}$ and the GT l. The image restoration model 1720 may output the low-resolution image $$\hat{x}^{LR}_{clean}$$

according to an input of the input image $x^{HR}$. The image restoration model 1720 may perform the image downscaling without the image restoration. The image restoration model 1720 may be trained based on the loss between the low-resolution image $$\hat{x}^{LR}_{clean}$$

and the GT $$x^{LR}_{clean}.$$

The characteristic application model 1730 may generate the preview image $\hat{x}^{LR}$ by applying the characteristic vector $\hat{l}$ to the low-resolution image $$\hat{x}^{LR}_{clean}.$$

Figure 18:
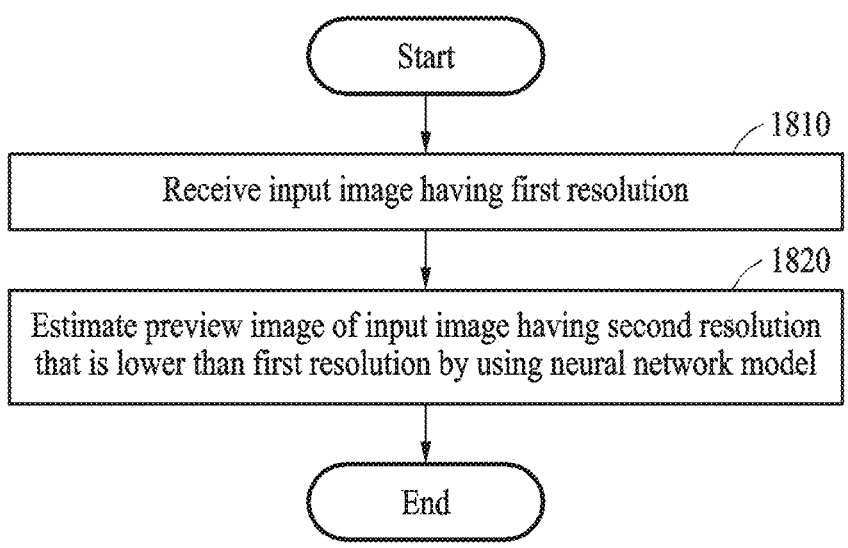
FIG. 18 is a flowchart illustrating an example of an image processing method.

FIG. 18 is a flowchart illustrating an example of an image processing method. Referring to FIG. 18, the image processing apparatus may receive an input image having a first resolution in operation 1810, and estimate a preview image of the input image having a second resolution that is lower than the first resolution by using a neural network model in operation 1820. The neural network model may apply an image characteristic of the input image having the first resolution to the preview image having the second resolution. The image characteristic observed from the input image having the first resolution may be observed from the preview image having the second resolution.

The image characteristic not observed from the input image having the second resolution, when the input image is downscaled to have the second resolution without applying the image characteristic of the input image to the preview image, may be observed from the preview image according to the application of the image characteristic of the input image to the preview image.

The image characteristic may include a degradation characteristic of the input image.

Operation 1820 may include estimating the image characteristic of the input image based on the input image, estimating a temporarily restored image having the second resolution by performing image downscaling and image restoration based on the input image, and applying the image characteristic to the temporarily restored image. The neural network model may include a first model configured to estimate the image characteristic of the input image, a second model configured to estimate the temporarily restored image, and a third model configured to apply the image characteristic to the temporarily restored image. The first model may output a characteristic vector corresponding to the image characteristic according to an input of the input image, and the third model may output the preview image according to an input of the temporarily restored image and the characteristic vector. The neural network model may include a fourth model configured to estimate the image characteristic of the input image, estimate the temporarily restored image, and apply the image characteristic to the temporarily restored image.

Operation 1820 may include estimating the image characteristic of the input image based on the input image, estimating a temporary image having the second resolution by performing image downscaling based on the input image, and applying the image characteristic to the temporary image. The neural network model may include a first model configured to estimate the image characteristic of the input image, a fifth model configured to estimate the temporary image, and a third model configured to apply the image characteristic to the temporary image.

The image processing apparatus may generate candidate restored images having the second resolution by performing a restoration task according to a plurality of restoration characteristics on the preview image, and may generate a restored image having the first resolution by performing a restoration task on the input image according to a candidate restoration characteristic selected from the plurality of candidate restoration characteristics. The image characteristics according to the candidate restoration characteristics observed from the candidate restored images having the first resolution when the candidate restored images are upscaled to have the first resolution may be observed from the candidate restored images having the second resolution.

Figure 19:
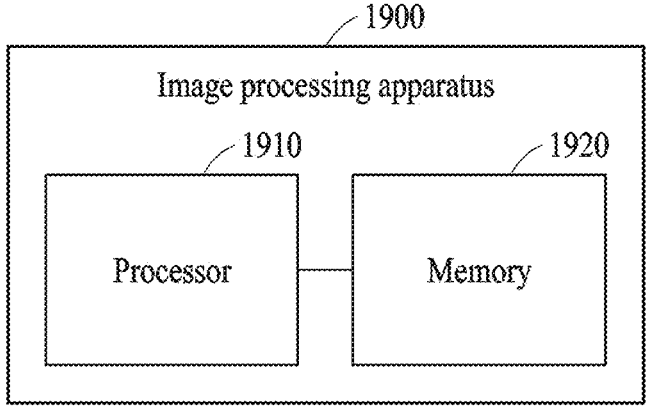
FIG. 19 is a block diagram illustrating an example of a configuration of an image processing apparatus.

FIG. 19 is a block diagram illustrating an example of a configuration of an image processing apparatus. Referring to FIG. 19, an image processing apparatus 1900 includes a processor 1910 and a memory 1920. The memory 1920 may be connected to the processor 1910, and may store instructions executable by the processor 1910, data to be computed by the processor 1910, or data processed by the processor 1910. The memory 1920 may include, for example, a non-transitory computer-readable storage medium, for example, a high-speed random access memory (RAM) and/or a non-volatile computer-readable storage medium (for example, at least one disk storage device, a flash memory device, or other non-volatile solid state memory devices).

The processor 1910 may execute the instructions to perform the operations described above with reference to FIGS. 1 to 18 and 20. For example, the processor 1910 may receive an input image having a first resolution and estimate a preview image of the input image having a second resolution that is lower than the first resolution by using a neural network model. The neural network model may apply an image characteristic of the input image having the first resolution to the preview image having the second resolution, and the image characteristic observed from the input image having the first resolution may be observed from the preview image having the second resolution. In addition, the description provided with reference to FIGS. 1 to 18, and 20 may apply to the image processing apparatus 1900.

Figure 20:
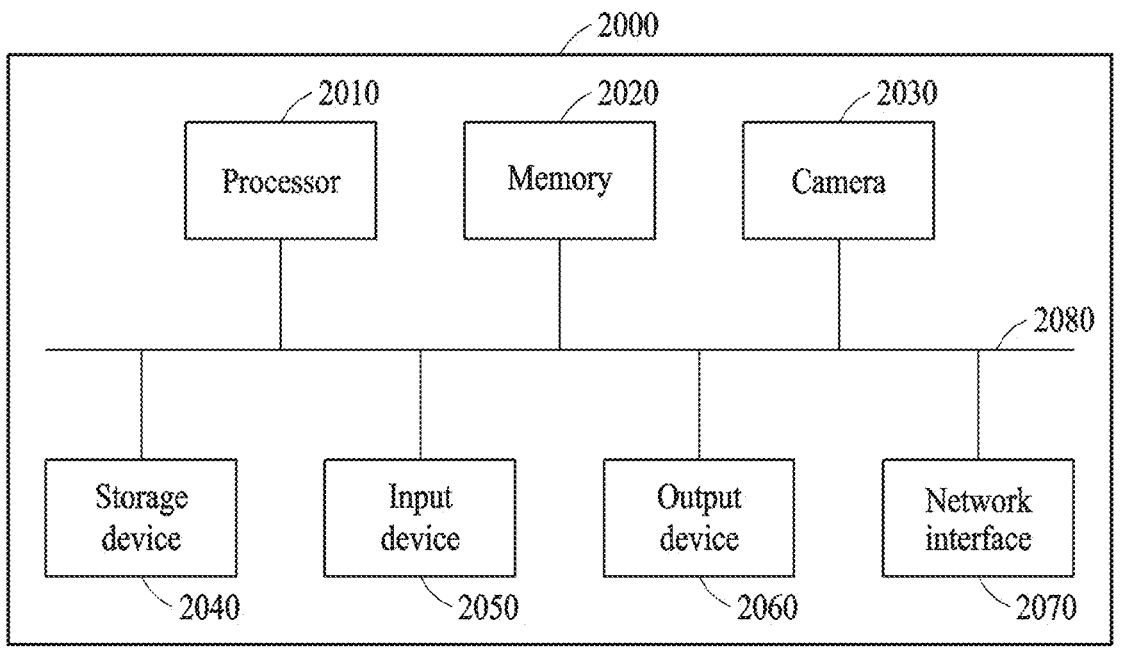
FIG. 20 is a block diagram illustrating an example of a configuration of an electronic apparatus.

FIG. 20 is a block diagram illustrating an example of a configuration of an electronic apparatus. Referring to FIG. 20, an electronic apparatus 2000 may include a processor 2010, a memory 2020, a camera 2030, a storage device 2040, an input device 2050, an output device 2060, and a network interface 2070, and these components may communicate with one another through a communication bus 2080. For example, the electronic apparatus 2000 may be implemented as at least a portion of, for example, a mobile device such as a mobile phone, a smart phone, a personal digital assistant (PDA), a netbook, a tablet computer, a laptop computer, and the like, a wearable device such as a smart watch, a smart band, smart glasses, and the like, a home appliance such as a television (TV), a smart TV, a refrigerator, and the like, a security device such as a door lock and the like, and a vehicle such as an autonomous vehicle, a smart vehicles, and the like. The electronic apparatus 2000 may structurally and/or functionally include the image processing apparatus 1900 of FIG. 19.

The processor 2010 may execute functions and instructions to be executed in the electronic apparatus 2000. For example, the processor 2010 may process instructions stored in the memory 2020 or the storage device 2040. The processor 2010 may perform one or more of the operations described above with reference to FIGS. 1 to 19. The memory 2020 may include a computer-readable storage medium or device. The memory 2020 may store instructions executed by the processor 2010, and may store related information while software and/or applications are being executed by the electronic apparatus 2000.

The camera 2030 may generate an input image. The input image may include a photo and/or video. The storage device 2040 may include a computer-readable storage medium or device. The storage device 2040 may store a greater amount of information than the memory 2020 and may store the information for a long period of time. The storage device 2040 may include, for example, a magnetic hard disk, an optical disc, a flash memory, a floppy disk, or other types of nonvolatile memory that are well-known in the art.

The input device 2050 may receive an input from a user through a traditional input method using a keyboard and a mouse, and a new input method using a touch input, a voice input, and an image input. The input device 2050 may include, for example, a keyboard, a mouse, a touch screen, a microphone, or any other device that detects an input from a user and transmits the detected input to the electronic apparatus 2000. The output device 2060 may provide an output of the electronic apparatus 2000 to a user through a visual, auditory, or tactile channel. The output device 2060 may include, for example, a display, a touch screen, a speaker, a vibration generating device, or any other device that provides an output to a user. The network interface 2070 may communicate with an external device through a wired or wireless network.

The example embodiments described herein may be implemented using a hardware component, a software component and/or a combination thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An image processing method comprising:
receiving an input image having a first resolution; and
estimating a preview image of the input image having a second resolution that is lower than the first resolution by using a neural network model,
wherein the neural network model is configured to generate a characteristic vector comprising a vector representation of a pixel-level image characteristic of the input image having the first resolution,
wherein the neural network model is configured to apply the pixel-level image characteristic of the input image having the first resolution to the preview image having the second resolution based on the characteristic vector, and
wherein the pixel-level image characteristic observed from the input image having the first resolution is observed from the preview image having the second resolution.

2. The method of claim 1, wherein the pixel-level image characteristic is not observed from the input image having the second resolution when the input image is downscaled to have the second resolution without applying the pixel-level image characteristic of the input image to the preview image, and wherein the pixel-level image characteristic is observed from the preview image according to the application of the pixel-level image characteristic of the input image to the preview image.

3. The method of claim 1, wherein the pixel-level image characteristic comprises a degradation characteristic of the input image.

4. The method of claim 1, wherein the estimating of the preview image comprises:
estimating the pixel-level image characteristic of the input image based on the input image;
estimating a temporarily restored image having the second resolution by performing image downscaling and image restoration based on the input image; and
applying the pixel-level image characteristic to the temporarily restored image.

5. The method of claim 4, wherein the neural network model comprises:
a first model configured to estimate the pixel-level image characteristic of the input image;
a second model configured to estimate the temporarily restored image; and
a third model configured to apply the pixel-level image characteristic to the temporarily restored image.

6. The method of claim 5,
wherein the first model is configured to output the characteristic vector, and
wherein the third model is configured to output the preview image according to an input of the temporarily restored image and the characteristic vector.

7. The method of claim 5, wherein the neural network model comprises:
a fourth model configured to estimate the pixel-level image characteristic of the input image, estimate the temporarily restored image, and apply the pixel-level image characteristic to the temporarily restored image.

8. The method of claim 1, wherein the estimating of the preview image comprises:
estimating the pixel-level image characteristic of the input image based on the input image;
estimating a temporary image having the second resolution by performing image downscaling based on the input image; and

applying the pixel-level image characteristic to the temporary image.

9. The method of claim 8, wherein the neural network model comprises:

a first model configured to estimate the pixel-level image characteristic of the input image;

a fifth model configured to estimate the temporary image, and a third model configured to apply the pixel-level image characteristic to the temporary image.

10. The method of claim 1, further comprising:

generating candidate restored images having the second resolution by performing a restoration task according to a plurality of candidate restoration characteristics on the preview image; and generating a restored image having the first resolution by performing a restoration task on the input image according to a candidate restoration characteristic selected from the plurality of candidate restoration characteristics.

11. The method of claim 10, wherein image characteristics according to the candidate restoration characteristics observed from the candidate restored images having the first resolution when the candidate restored images are upscaled to have the first resolution, are observed from the candidate restored images having the second resolution.

12. A non-transitory computer-readable storage medium storing instructions that, when executed by a processor, cause the processor to perform the method of claim 1.

13. An image processing apparatus comprising:

a processor; and a memory configured to store instructions executable by the processor, wherein, in response to the instructions being executed by the processor, the processor is configured to:

receive an input image having a first resolution;

estimate a preview image of the input image having a second resolution that is lower than the first resolution by using a neural network model, wherein the neural network model is configured to apply a pixel-level image characteristic of the input image having the first resolution to the preview image having the second resolution, wherein the pixel-level image characteristic observed from the input image having the first resolution is observed from the preview image having the second resolution, and wherein, to estimate the preview image, the processor is configured to:

estimate the pixel-level image characteristic of the input image based on the input image;

estimate a temporarily restored image having the second resolution by performing image downscaling and image restoration based on the input image; and apply the pixel-level image characteristic to the temporarily restored image.

14. The apparatus of claim 13, wherein the pixel-level image characteristic is not observed from the input image having the second resolution when the input image is downscaled to have the second resolution without applying the pixel-level image characteristic of the input image to the preview image, and wherein the pixel-level image characteristic is observed from the preview image according to the application of the pixel-level image characteristic of the input image to the preview image.

15. The apparatus of claim 13, wherein, to estimate the preview image, the processor is configured to:

estimate the pixel-level image characteristic of the input image based on the input image;

estimate a temporary image having the second resolution by performing image downscaling based on the input image; and apply the pixel-level image characteristic to the temporary image.

16. The apparatus of claim 13, wherein the processor is configured to:

generate candidate restored images having the second resolution by performing a restoration task according to a plurality of candidate restoration characteristics on the preview image; and generate a restored image having the first resolution by performing a restoration task on the input image according to a candidate restoration characteristic selected from the plurality of candidate restoration characteristics.

17. The apparatus of claim 16, wherein image characteristics according to the candidate restoration characteristics observed from the candidate restored images having the first resolution when the candidate restored images are upscaled to have the first resolution are observed from the candidate restored images having the second resolution.

18. An electronic apparatus comprising:

a camera configured to generate an input image; and a processor configured to:

receive an input image having a first resolution; and estimate a preview image of the input image having a second resolution that is lower than the first resolution by using a neural network model, wherein the neural network model is configured to generate a characteristic vector comprising a vector representation of a pixel-level image characteristic of the input image having the first resolution, wherein the neural network model is configured to apply the pixel-level image characteristic of the input image having the first resolution to the preview image having the second resolution based on the characteristic vector, and wherein the pixel-level image characteristic observed from the input image having the first resolution is observed from the preview image having the second resolution.

19. The electronic apparatus of claim 18, wherein the pixel-level image characteristic is not observed from the input image having the second resolution when the input image is downscaled to have the second resolution without applying the pixel-level image characteristic of the input image to the preview image, and wherein the pixel-level image characteristic is observed from the preview image according to the application of the pixel-level image characteristic of the input image to the preview image.

* * * * *